United States Patent [19]

Reindl et al.

[11] Patent Number: 5,180,704

[45] Date of Patent: Jan. 19, 1993

[54] OIL SORPTION WITH SURFACE-MODIFIED RUBBER

[75] Inventors: Wilhelm Reindl, St. Paul; Doil Williams, Ramsey, both of Minn.

[73] Assignee: Regents of the University of Minnesota, Minneapolis, Minn.

[21] Appl. No.: 688,135

[22] Filed: Apr. 19, 1991

[51] Int. Cl.$^5$ .............................................. B01J 20/26
[52] U.S. Cl. .................................... 502/402; 264/109
[58] Field of Search ................ 502/402, 401; 264/109

[56] References Cited

U.S. PATENT DOCUMENTS

| | | | |
|---|---|---|---|
| Re. 31,087 | 11/1982 | Sohl | 210/671 |
| 3,567,660 | 3/1971 | Winkler | 260/2.3 |
| 3,739,913 | 6/1973 | Bogosian | 210/23 |
| 4,028,288 | 6/1977 | Turner | 264/109 X |
| 4,039,489 | 8/1977 | Fletcher et al. | 260/2.5 |
| 4,094,776 | 6/1978 | Noguchi et al. | 210/27 |
| 4,107,051 | 8/1978 | Lorentzen | 210/500 |
| 4,172,031 | 10/1979 | Hall et al. | 210/36 |
| 4,182,677 | 1/1980 | Bocard et al. | 210/36 |
| 4,209,382 | 6/1980 | Noguchi et al. | 208/22 |
| 4,302,337 | 11/1981 | Larson et al. | 210/662 |
| 4,609,580 | 9/1986 | Rockett et al. | 428/198 |
| 4,728,343 | 3/1988 | Snyder | 55/59 |
| 4,764,282 | 8/1988 | Snyder | 210/690 |
| 4,832,852 | 5/1989 | Wells et al. | 210/671 |
| 5,067,984 | 11/1991 | Starr | 502/401 X |

FOREIGN PATENT DOCUMENTS

| | | |
|---|---|---|
| 348491 | 2/1979 | Austria . |
| 3606356 | 9/1987 | Fed. Rep. of Germany . |
| 49-127889 | 12/1974 | Japan . |
| 1075235 | 7/1967 | United Kingdom . |

*Primary Examiner*—Patrick P. Garvin
*Attorney, Agent, or Firm*—Kinney & Lange

[57] ABSTRACT

A method for sorbing oil comprises contacting the oil with an oil sorbing article comprising a plurality of substantially cross-linked polymer particles having adhesive layers formed on a portion of the outer surfaces of a majority of the particles. The particles are attached together with the adhesive areas to define a plurality of interstitial spaces. The method further comprising allowing the oil to sorb into the article. In the preferred embodiment, the adhesive areas are formed by heating the portion of the outer surfaces to a sufficient temperature to eliminate a portion of the cross-linking. With the cross-linking eliminated, the portion of the outer surfaces becomes tacky enabling adjacent particles to adhere to one another and form the plurality of interstitial spaces. The article comprises interstitial spaces to trap air causing the article to remain on the surface of an aqueous medium.

25 Claims, 4 Drawing Sheets

OIL SORPTION WITH SURFACE-MODIFIED RUBBER

BACKGROUND OF THE INVENTION

1. Field of the Invention

The present invention relates to an article for oil sorption, and more particularly, to an article having a plurality of interstitial spaces formed from a plurality of adhered cross-linked polymer particles and to a method for making the same.

2. Description of the Prior Art

Contaminated surfaces resulting from spilled oil pose a severe threat to the environment. Such oil spills are found both on land and water. Oil pools collect around above ground storage tanks and in the ground around under ground storage tanks and oil transportation pipes. Oil spills also occur from tanker and underwater oil drilling accidents as well as smaller spills in harbors, rivers, waterways and other navigation channels resulting from the daily loading, unloading and storage of oil throughout the world.

Oil spills on water bodies are particularly serious. Besides contaminating the surface of the water body and posing a significant risk to waterfowl, surface oil invariably reaches and contaminates the adjoining land. Even if the adjoining land is not contaminated, with time, the oil will settle as conglomerates at the bottom of the water body, thus destroying plants and other forms of aquatic life.

Various methods have been proposed and used for removing spilled oil from both land and water. These methods include mechanical skimmers, microorganisms that consume the spilled oil, and detergents. Skimmers require complex machinery; microorganisms can only be used within narrow environmental constraints, and detergents pose other environmental hazards. In view of these drawbacks, sorbent articles are increasingly becoming the preferred method of recovering spilled oil. Such sorbent articles and materials presently used include straw and ground corn cobs, some mineral adsorbents like perlite, and clays, as well as oil absorbing polymers.

It has been known for sometime that vulcanized rubber and other types of cross-linked polymers will absorb oil and organic vapors to a varying degree. Examples of such use are disclosed in U.S. Pat. No. 4,728,343 issued to Syder, U.S. Pat. No. 3,567,660 issued to Winkler, U.S. Pat. No. 4,039,489 issued to Fletcher et al. and U.S. Pat. No. 4,182,677 issued to Bocard et al.

U.S. Pat. No. 4,728,343 discloses a method of absorbing organic vapors in a storage container by suspending ground rubber particles in a mesh net. The rubber particles absorb the vapors so that the vapor concentration does not approach an explosive level.

U.S. Pat. No. 3,567,660 discloses a method for absorbing oil spills with shredded or ground rubber from automobile tires. The tires are ground to a particle size between 1 and 10 mesh. The Winkler patent teaches that rubber particles larger than 1 mesh have a tendency to sink in water, while particles smaller than 10 mesh dissolve quickly in oil. When the shredded rubber particles are applied to spilled oil on a contaminated water surface, the particles swell from the imbibed oil and coagulate to form conglomerates. In the preferred embodiment, the shredded rubber tires are combined with powdery polystyrene. The Winkler patent teaches that this addition speeds absorption of the spilled oil.

U.S. Pat. No. 4,039,489 discloses a method for absorbing oils with polymer particles having a minimal amount of cross-linking. In the preferred embodiment, the mean chain length of the polymer between cross-linking sites is recommended, at a minimum, to be at least 4,000 chain atoms long. Although the Fletcher et al. patent teaches that minimal cross-linked polymers absorb oil readily, the resulting absorbent is physically weak when swollen with oil. When used to absorb an oil spill on water, the polymer tends to break apart. To overcome this problem, the Fletcher et al. patent teaches coating a fiber or fabric substrate with the minimal cross-linked polymer. The fiber substrate provides a support structure.

Another method for producing oil absorbing polymers is disclosed in U.S. Pat. No. 4,182,677. This patent teaches that rubber particles of the size 0.1 to millimeters can readily absorb hydrocarbons or organic liquids if the particles are first subjected to organic or inorganic acid solvents. The patent teaches that rubber particles are created by using crushers or by grinding the rubber waste after cooling it to a very low temperature, for example, in liquid air. To enhance the absorption of oil, the rubber particles are treated with a mineral or organic acid. The rubber particles are stored in suspension in a pure acid or diluted acid solution. After filtration, the rubber particles are washed with water in order to remove the acid. In U.S. Pat. No. 4,182,677, the treated rubber particles are stirred in suspension with a mechanical stirrer or through convenient shaping of the container apparatus. The patent teaches that it is advantageous to use rubber waste of a density lower than 1.5 so that, after the hydrocarbons have been absorbed, the rubber particles rise to the surface.

SUMMARY OF THE INVENTION

The present invention provides an improved oleophylic article. The article comprises a plurality of substantially cross-linked polymeric particles adhered together on a portion of outer surfaces of a majority of the particles. The adhered particles define a plurality of interstitial spaces. The interstitial spaces trap air within the article during sorption of a spilled oil body and prevent the article from sinking in an aqueous medium.

The present invention further provides a method for making the oleophylic article. The method comprises: working substantially cross-linked polymer particles to form adhesive areas on at least a portion of outer surfaces of a majority of the particles; and adhering the particles using contacting adhesive areas to define interstitial spaces between the joined particles. In the preferred embodiment, the step of working comprises eliminating a portion of the cross-linking on the portion of the outer surface area of the particle to which the adjacent particle is attached. With the cross-linking at least partially eliminated, the corresponding outer surfaces become tacky enabling the particles to adhere and be attached.

The present invention is equally suited for sorption of oil in aqueous and non-aqueous situations. In either case, the method for sorbing oil comprises contacting the oil with the article of the present invention having a plurality of interstitial spaces defined by particles attached together with adhesive areas. When used in an aqueous solution, the interstitial spaces trap air pockets which allow the article to float on the surface of the solution during and after oil sorption.

DETAILED DESCRIPTION OF THE PREFERRED EMBODIMENTS

Figure 1:
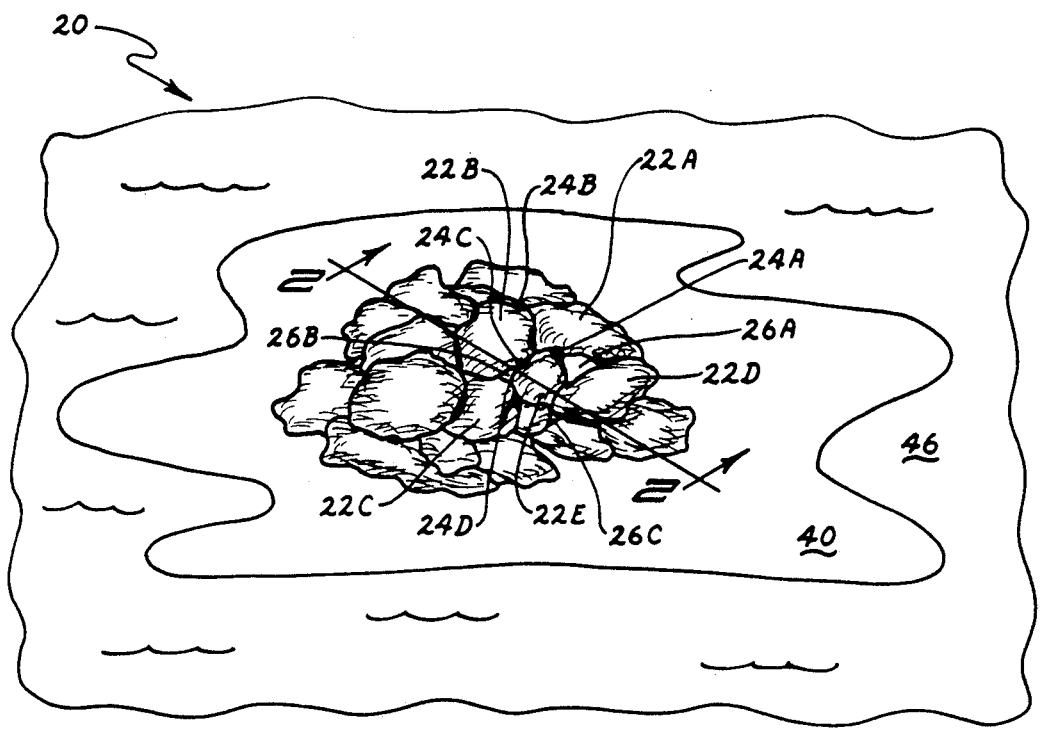
FIG. 1 is a perspective view of a first embodiment of an oleophylic article of the present invention.

FIG. 1 shows a perspective view of an oleophylic article, generally indicated at 20, made according to the present invention. Article 20 comprises a plurality of substantially cross-linked polymer particles, such as particles 22A, 22B, 22C, 22D and 22E, adhered together at a plurality of adhesive areas such as 24A, 24B, 24C and 24D and remaining unattached at other areas. Adhesive areas 24A through 24D secure particles 22A through 22E together on respective outer surface portions while leaving other surface areas spaced to form a plurality of interstitial spaces or air voids such as 26A, 26B and 26C. The particle surfaces defining the plurality of interstitial spaces and the cross-linked polymer particles themselves provide article 20 with the ability to both adsorb and absorb oil. The term "oil" as used herein is to be construed as meeting the definition of the term as found in *Hackh's Chemical Dictionary*, 4th Edition, McGraw-Hill, Inc., New York, 1969.

Figure 2:
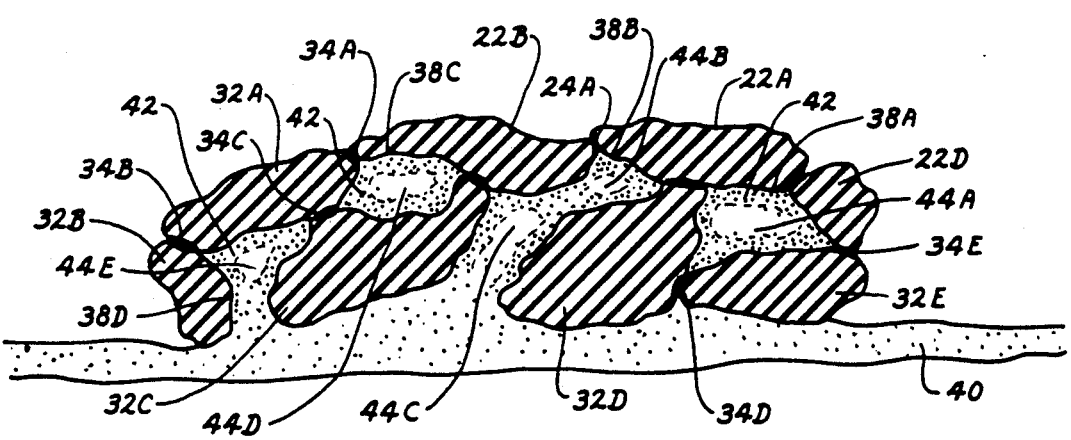
FIG. 2 is a fragmentary sectional view of the article taken as on line 2—2 in FIG. 1.

As illustrated in FIG. 2, article 20 comprises additional particles such as particles 32A and 32B which comprise other outer surface portions of article 20, as well as particles 32C, 32D and 32E, by way of example, which are attached to outer surface particles 22A, 22B, 32A or 32B, or to other outer surface particles and inner particles, not shown. As with particles 22A through 22E, particles 32A through 32E are substantially cross-linked polymer particles adhered to adjacent particles at a plurality of adhesive areas 34A, 34B, 34C, 34D and 34E. As shown in the preferred embodiment of FIGS. 1 and 2, adhesive areas 24A through 24D and 34A through 34D are formed on a small portion of each respective particle outer surface. Interconnection of particles 22A, 22B and 32A through 32E at spaced locations while leaving other locations unattached define a plurality of interstitial spaces 38A, 38B, 38C and 38D which are used to retain portions of an oil body 40 therein. Although illustrated in FIG. 2 with only a maximum of three bonds for each particle, it is understood that each particle forming article 20 is connected to one or a plurality of adjacent particles with one or a plurality of adhesive bonds.

Analysis indicates that article 20 sorbs oil body 40 through both adsorption and absorption. Upon initial contact with oil body 40, the outer surfaces forming each interstitial space 38A through 38D are believed to adsorb oil and form a continuous oil film 42 on the surfaces defining such spaces, within each corresponding interstitial space, thereby trapping air in the interstitial spaces. A plurality of air pockets such as 44A, 44B, 44C, 44D and 44E are thus formed within article 20. With time, a portion of oil film 42 penetrates the outer surfaces of particles 22A, 22B and 32A through 32D to be absorbed within each corresponding polymeric particle. Absorption of oil film 42 causes swelling of the substantially cross-linked polymeric particles 22A, 22B, and 32A through 32D, which in turn is believed to further increase the strength of adhesive bonds 34A through 34D.

When article 20 has sorped a quantity of oil, the article 20 forms a conglomerate that is readily manageable. As illustrated in FIG. 1, due to the trapped air pockets such as 44A through 44E illustrated in FIG. 2, article 20 will remain afloat above a water body 46 during and after oil sorption.

In addition to the sorption capabilities described above, article 20 can be combined with other known oil spill control. For example, a flame retardant chemical such as sodium molybdate can be applied to the article in order to reduce the possibility of oil fires. In addition, oil consuming microorganisms such as those from Cybron Chemicals Inc. of Birmingham, N.J., can be applied to portions of the outer surfaces of a majority of the adhered particles. The present invention provides a structure that protects the micro-organisms from dispersement when the water body is agitated.

Nutrients such as nitrogen and phosphorus can be added to the structure to enhance micro-organism oil comsumption. Such nutrients are readily dissolvable in an oil base or medium, as for example, Inipol EAP 22 from Exxon Research and Engineering Co. of Annandale, N.J. which is a source of nitrogen. In the preferred embodiment, the oil medium along with the dissolved nutrients would be absorbed within the polymer structure of a majority of the particles. Absorption is limited in that the particles are not completely saturated with the oil based nutrients. Partial saturation of the particles enables the particles to absorb additional oil when the article is placed on an oil spill while diffusion of nutrients from within the particles to the outer surface provides the micro-organisms with nutrients at a gradual rate.

In the practice of the present invention, a wide variety of cross-linked or vulcanized materials may be employed. Such vulcanized materials are readily available as processing scrap, particularly from tires, and for purposes of the invention, the stocks are based on natural rubber, or on any of the synthetic rubbers used in the tire industry, for example, SBR, butyl rubber, or polychloroprene or mixtures thereof. Conventional tire sidewall stocks and tire tread stocks are equally suitable.

Scrap tires are preferably used in the instant invention and, as noted above, scrap tires comprise standard vulcanizable materials (i.e., rubber capable of cross-linking) which are compounded and vulcanized in accordance with the standard procedures known in the industry. The vulcanizable materials are any of the unsaturated hydrocarbon polymers exemplified by the diene polymers (which may be halogenated), such as polybutadiene, polychloroprene or polyisoprene, especially polybutadiene or polyisoprene having a low or high content of cis-polymer; copolymer rubbers such as SBR (copolymer of styrene and butadiene), butyl rubber (copolymers based on isomonoolefins such as isobutylene and a small amount, e.g., 0.25 to 105 of a conjugated diene such as isoprene), and even natural polymers such as guayule rubber, Hevea rubber and the like. Also depolymerized rubber may be used.

Other unsaturated useable hydrocarbonic polymers are the rubbery interpolymers of at least two alpha-monoolefins (e.g., ethylene, propylene, butene-1, hexene-1, 4-methylpentene-1, 5-methylhexene-1, 4-ethylhexene-1 or similar olefins having the formula $CH_2=CHR$, in which R is hydrogen or a hydrogen radical, particularly a saturated alkyl hydrocarbon radical having from 1 to 8 carbon atoms) and at least one copolymerizable diene such as dicyclopentadiene, methylcyclopentadiene dimer, 1,4-hexadiene, 11-ethyl-1, 11-tridecadiene, 1,9-octadecadiene, 1,5-cyclooctadiene, methylene norbornene, ethylidene norbornene or other suitable dienes (such rubbers are sometimes referred to as "EPDM"). Terpolymers of the kind recited in the preceding sentence contain from about 1 to 25% (more preferably about 2 to about 15%) by weight of dicyclopentadiene or the like are preferred.

The invention can be practiced with rubbers prepared by methods other than solution polymerization, such as, for example, by emulsion polymerization. Typical of such rubbers are emulsion polymerized diene homopolymers or copolymers including butadiene-styrene copolymer or copolymers with other copolymerizable monomers such as acrylonitrile, vinylpyridine, ethyl acrylate and the like.

The amount of scrap rubber or other types of substantially cross-linked polymer to be prepared as the oleophylic article of the present invention is dependent upon the amount of oil to be sorbed. This amount will vary from case to case; however, determination of the amount is within the knowledge of persons skilled in the art. The selection depends on the circumstances.

As described above, the adhesive areas of article 20, such as areas 34A through 34E, connect each of the particles to an adjacent particle to define the plurality of interstitial spaces. In general, article 20 is formed by a method comprising: working the substantially cross-linked polymer particles to form adhesive areas on at least a portion of outer surfaces of a majority of the particles; and attaching the particles to each other using the adhesive areas to define the interstitial spaces between the attached particles.

"Working" is defined as any step or succession of steps to produce the adhesive areas. In the preferred embodiment, this step comprises eliminating a portion of the cross-linking on the portion of the outer surface to which the adjacent particles are attached. With the cross-linking eliminated, the outer surface is tacky, enabling the area to be secured to another adhesive area as well as those areas in which the cross-linking substantially remains. In a further preferred embodiment, the particle surfaces are softened by heating the outer surface portions to a temperature that alters or breaks the cross-linking sites. This definition of "working" is understood to include all processes known in the art to "de-vulcanize" or break cross-linking in cross-linked polymers.

Furthermore, it is within the scope of the present invention to use a separate suitable adhesive that can adhere the particles together. Characteristics of such an adhesive include substantial insolubility to the oil to be sorbed and the ability to apply the separate adhesive to at least a portion of a majority of the plurality of substantially cross-linked polymer particles.

Figure 3:
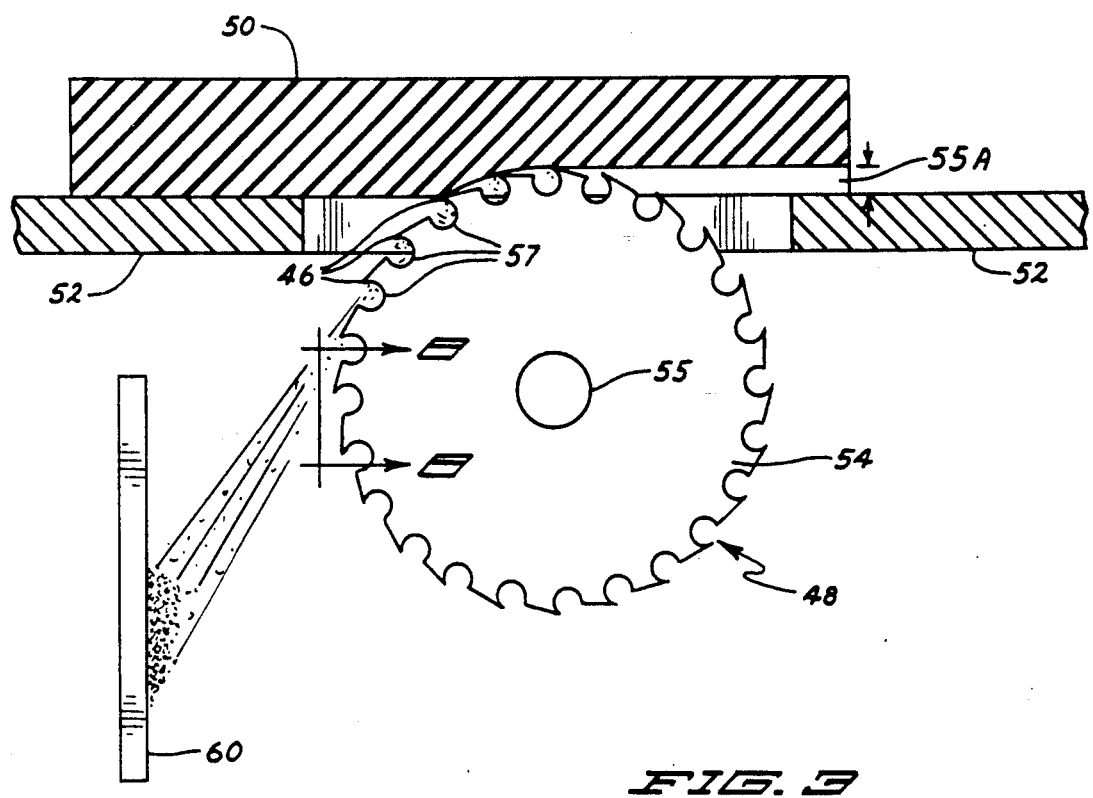
FIG. 3 is a schematic representation of a cutting apparatus comprising a rotating saw blade for producing the article in FIG. 1.

FIG. 3 illustrates the preferred method of processing cross-linked polymer blocks, such as used rubber tire tread or sidewall stock, into the oleophylic article 20 shown in FIGS. 1 and 2. Referring to FIG. 3, the cross-linked rubber block 50 is placed on support member 52 to engage a cutting apparatus 48. In the preferred embodiment, cutting apparatus 48 comprises a rotating saw blade 54 or a plurality of saw blades, each having a plurality of cutting teeth 46. Saw blade 54 rotates on an axis 55 and is powered from any suitable power source, not shown. In a conventional manner, block 50 is moved against rotating blade 54 with a suitable rate to cut a 55A therein. As each cutting edge of the plurality of teeth 46 engages a portion of block 50, frictional heat generated during the process of abrasively cutting with teeth 46 works, at least a portion of the outer surfaces of the particle being cut. The frictional heat raises the temperature of the outer surface of the cut particle to a temperature sufficient to de-vulcanize or eliminate at least a portion of the cross-linking between the polymer molecules at the surface of a majority of the particles being cut.

With the outer surface cross-linking eliminated, the corresponding outer surface portion of the cut particle is tacky. Continued rotation of blade 54 propels the particles having tacky outer surfaces toward other previously cut (and tacky) particles. Such previously cut particles can reside in relief spaces 57 between the plurality of teeth 46 or on an impact plate 60 located proximate to rotating blade 54. The particles are propelled from blade 54 because of the centrifugal force generated as blade 54 rotates. The cut particles impinge upon other previously cut particles with the tacky outer surfaces of the majority of the particles contacting surfaces of adjacent particles. The force of impingement is sufficient to form the adhesive bonds using the adhesive areas such that the particles are attached in a random manner as shown in FIG. 2. The adhered particles are removed from plate 60 at a sufficient rate to prevent the build up of heat which could lead to additional (and excessive) de-vulcanization or cross-linking elimination of the particles.

Figure 8:
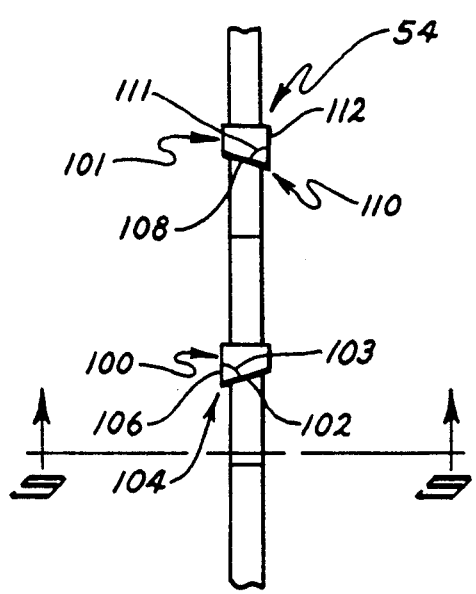
FIG. 8 is a fragmentary top plan view of the rotating saw blade taken as on line 8—8 in FIG. 3.
Figure 9:
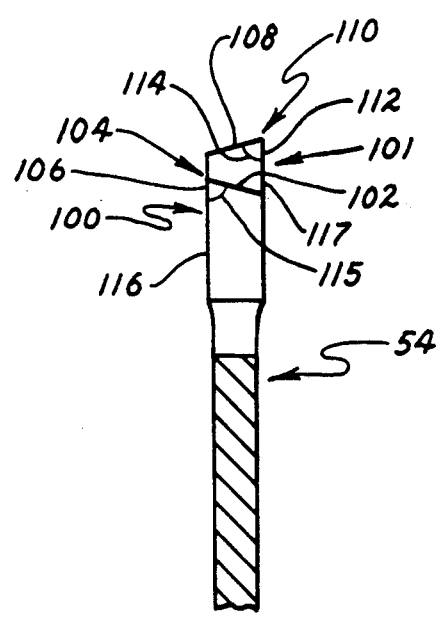
FIG. 9 is a sectional view of the rotating saw blade taken as on line 9—9 in FIG. 8.

In the preferred embodiment, blade 54 comprises a "cross-cut" saw of conventional design having the plurality of teeth 46 on blade 54 arranged as shown in FIGS. 8 and 9. FIG. 8 is a fragmentary top plan view of blade 54 showing two sequential teeth 100 and 101 of the plurality of teeth 46. Tooth 100 comprises a cutting edge 102 that is angled back from a leading point 104 at an angle 103 of approximately 75° with reference from a side top surface edge 106. Tooth 101 is substantially similar to tooth 100 except that tooth 101 comprises a cutting edge 108 that is opposite to that of cutting edge 102. As shown in FIG. 8, cutting edge 10B angles back from a leading point 110 at an angle 111 approximately 75° from an opposite side top surface edge 112.

FIG. 9 is a sectional front plan view of cross-cut blade 54. FIG. 9 shows that cutting edges 102 and 108 are also angled down opposite to one another from leading points 104 and 110, respectively. Each cutting edge 102 and 108 forms an angle 114 and 115 of approximately 75° between corresponding opposite side surfaces 116 and 117.

Analysis indicates that inclination of the cutting edges from a corresponding leading point allows the cross-cut saw to cut the polymer block with minimal tearing. Other rotating blades, such as a dado blade have been used on cutting apparatus 48; however, such a blade has a cutting edge that is neither angled downwardly nor backwardly from a leading point. When used on cutting apparatus 48, it is believed the dado blade strikes the polymer block laterally along the cutting edge and tears rather than cuts the particles from the polymer block. Such tearing does not appear to generate enough frictional heat to eliminate the cross-linking on portions of the outer surface of a majority of the particles. Without elimination of the cross-linking, the cut particles do not adhere to each other to form interstitial spaces and will sink when placed on an aqueous medium. When the dado blade was modified to include an angled cutting edge, adhered particles of the present invention were produced.

Figure 4:
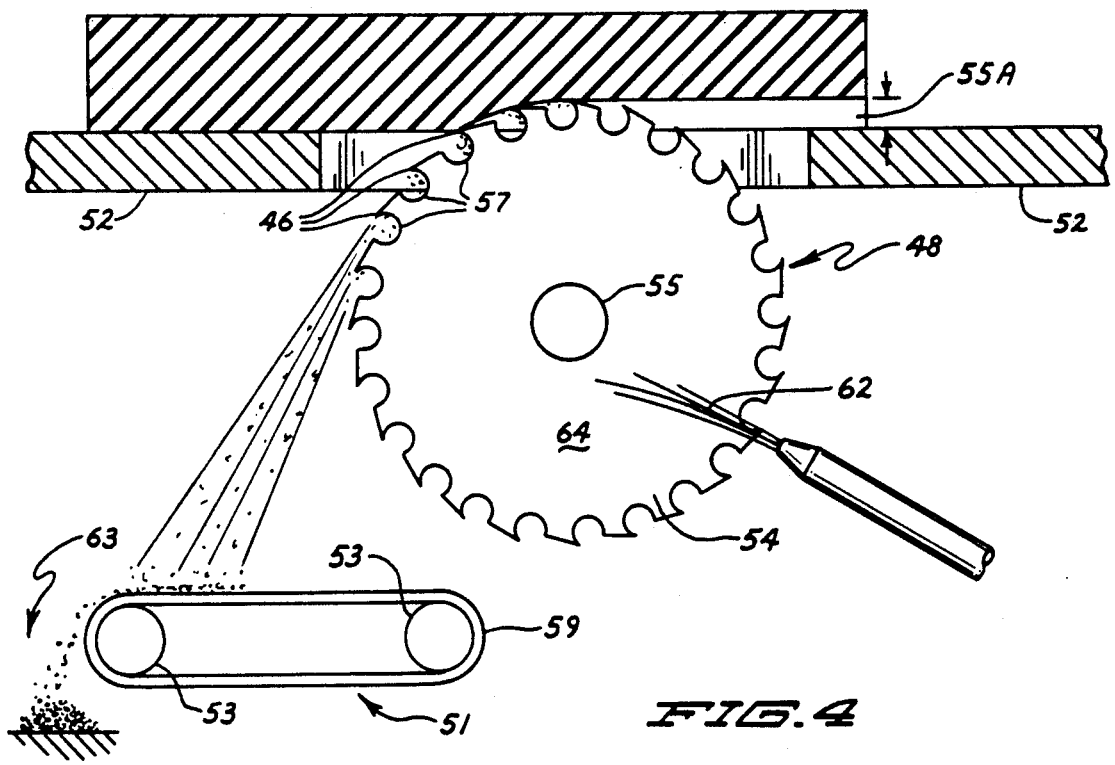
FIG. 4 is a schematic representation of improvements to the cutting apparatus in FIG. 3.

Improvement to the method shown in FIG. 3 are shown in FIG. 4. Referring to FIG. 4, a lubricant 62 is sprayed on blade 54 as teeth 46 rotate to cut block 50. Lubricant 62 reduces the frictional heat developed on side surfaces 64 of blade 54 thus preventing block 50 from adhering to blade 54. Lubricant 62 allows teeth 46 to engage block 50 and work the outer surface portions of the cut particles at an increased rate. Lubricant 62 may comprise water, or any suitable non-detergent oil or combination thereof. In the preferred embodiment, lubricant 62 is sprayed from a nozzle 66 of conventional design. Centrifugal force propels lubricant 62 toward teeth 46 along side surfaces 64 as blade 54 rotates.

FIG. 4 further shows a conveyor assembly 51 to receive particles cut but cutting apparatus 48. Conveyor assembly 51 comprises a belt 59 secured around opposed roller assemblies 53 that are driven by a suitable power source, not shown. Belt 59 receives both adhered particles and unadhered particles from cutting apparatus 48, and provides a suitable impingement surface upon which additional particles may be adhered to each other. Conveyor assembly 51 transfers the adhered particles to a remote collection location 63.

Figure 5:
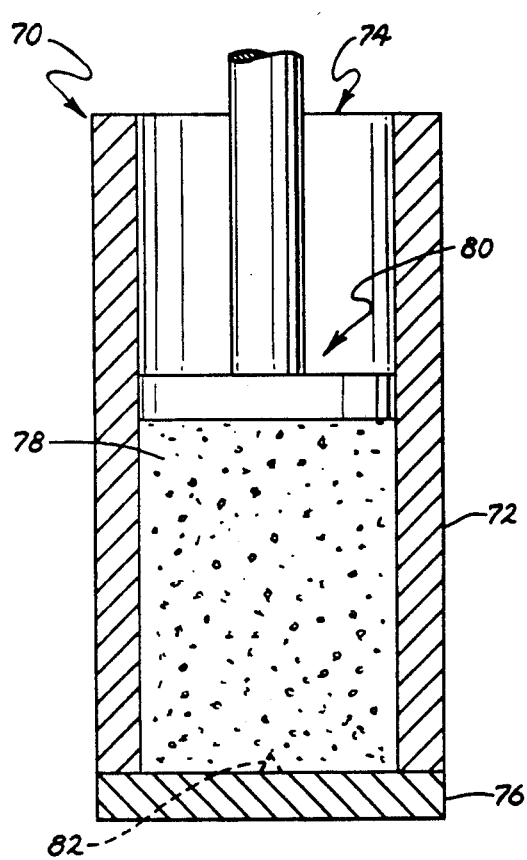
FIG. 5 is a sectional view of a pressing apparatus for producing a second embodiment of the oleophylic article of the present invention.
Figure 6:
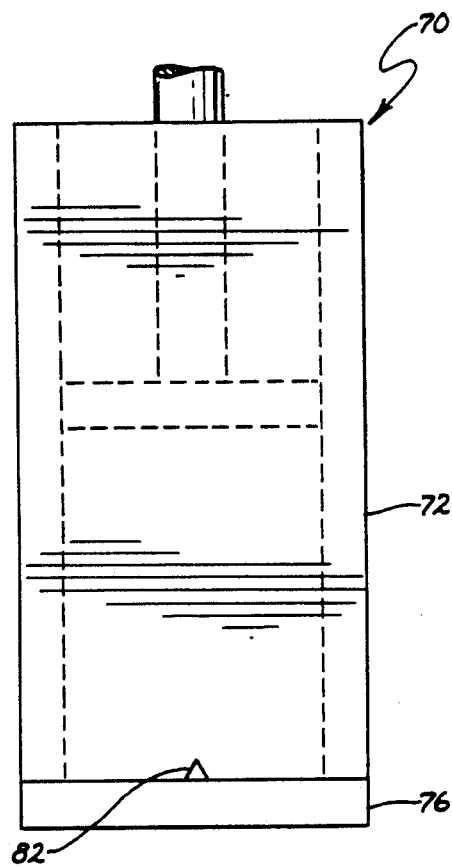
FIG. 6 is a front plan view representation of the pressing apparatus in FIG. 5.

A second preferred method for forming oleophylic article 20 having the interstitial spaces of FIGS. 1 and 2 is shown in FIGS. 5 and 6 as a pressing apparatus 70. Pressing apparatus 70 comprises a block 72 having a cylindrical opening 74. Block 72 is secured at one end to a support plate 76 to form an enclosure or container for a plurality of substantially cross-linked particles 78 which have been precut or ground to a suitable size. A piston 80 is positioned within opening 74 and is moveable to compress particles 78 within opening 74. In the preferred embodiment, a suitable orifice 82 is provided to allow compressed particles to exit apparatus 70.

In operation, block 72 is heated to a temperature slightly below the temperature at which the cross-linking is eliminated on the outer surfaces of a majority of particles 78. As piston 80 is displaced within opening 74 toward support plate 76 to compress particles 78, additional heat is generated. The additional heat raises the outer surface temperature of a majority of particles 78 above the temperature sufficient to de-vulcanize or eliminate cross-linking and form the adhesive surface areas. Since pressure from piston 80 is maintained, the compressed particles 78 are forced through orifice 82. As compressed particles 78 are forced through orifice 82, additional heat is worked on the outer surfaces of the particles to form additional adhesive areas that in turn adhere to opposed surfaces of adjacent particles. Once exiting orifice 82, the adhered particles expand and break some of the adhesive bonds to form an oleophylic article 90 shown in FIG. 7. Article 90 is cylindrical in shape but includes interstitial spaces similar to spaces 38A through 38D shown in FIG. 2. The size and shape of article 90 can be selectively altered by varying the size and shape of orifice 82.

Figure 10:
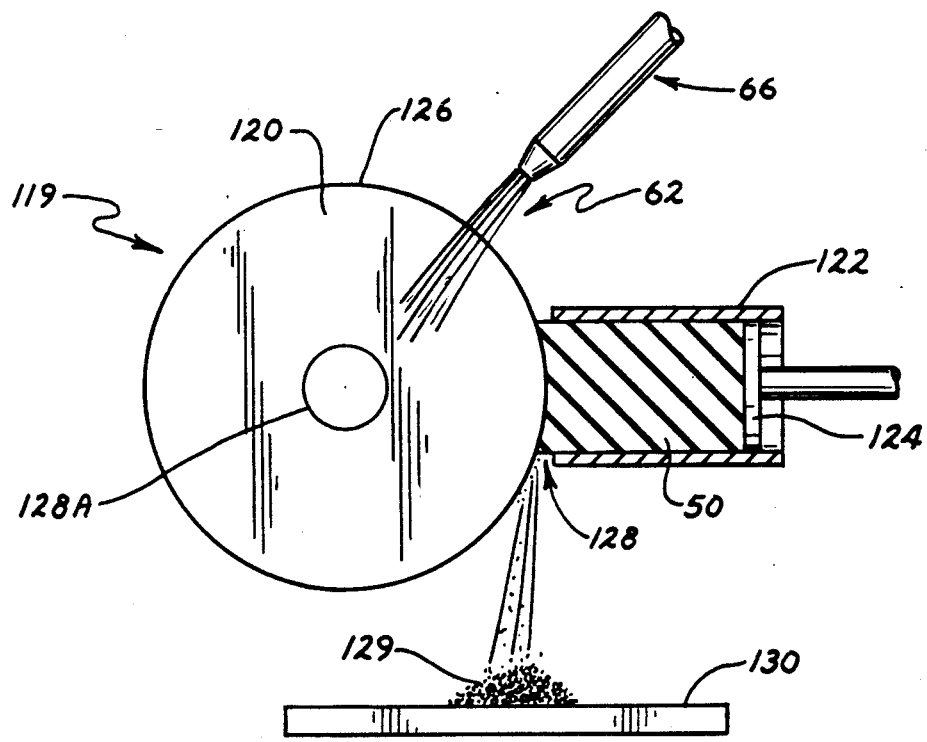
FIG. 10 is a view of a second cutting apparatus for producing the first embodiment of the oleophylic article of the present invention.

Another cutting apparatus 119 suitable for forming the oleophylic article of FIGS. 1 and 2 is shown in FIG. 10 comprising a grinding drum 120. Referring to FIG. 10, the cross-linked rubber block 50 is placed in a cylinder 122 having a piston 124 which is movable under power. In this embodiment, grinding drum 120 comprises a plurality of grinding teeth that are randomly spaced along an outside surface 126. Drum 120 rotates around a drum axis 128A powered from any suitable power source, not shown. Block 50 is directed against rotating drum 120 with suitable pressure from piston 124 to grind an end 128 of block 50. As grinding surface 126 contacts block end 128, frictional heat present during the process of abrasively cutting or grinding block 50 works at least a portion of the outer surface of the particles being cut. The frictional heat raises the temperature of the outer surface of the cut particle to a temperature sufficient to de-vulcanize or eliminate at least a portion of the cross-linking between the polymer molecules at the surface of a majority of particles being cut.

With the cross-linking eliminated, the corresponding outer surface portion of the cut particle is tacky. Continued rotation of drum 120 propels the particles having tacky outer surfaces towards other previously cut and tacky particles 129. Such previously cut particles typically are located on an impact plate 130 located proximate to rotating drum 120. The particles are propelled from grinding surface 126 because of the centrifugal force generated as drum 120 rotates. The cut particles impinge upon other previously cut particles with the tacky outer surfaces of the majority of the particles contacting surfaces of adjacent particles. The force of impingement is sufficient to form the adhesive bonds using the adhesive areas such that the particles are attached in a random manner as shown in FIG. 2. The adhered particles are removed from plate 130 at a sufficient rate to prevent the build up of heat which could lead to additional (and excessive) de-vulcanization or cross-linking elimination of the particles.

Particle production is increased with a lubricant 62 sprayed on grinding surface 126 from nozzle 66 of conventional design. Lubricant 62 prevents excessive heat from being generated which can lead to excessive de-vulcanization of the particles. Lubricant 62 may comprise water, any suitable non-detergent oil or combination thereof.

To further increase particle production impact plate 130 may be replaced with conveyor assembly 51 shown in FIG. 4. Conveyor assembly 51 receives the particles from drum 120 and transfers the adhered particles to a remote collection location.

The following non-limitative examples illustrate production of the oleophylic article of the present invention according to the methods disclosed above. Additional examples are provided for oil sorption capabilities in aqueous and non-aqueous mediums.

EXAMPLE 1

An oleophylic article mass in accordance with the present invention was made generally as illustrated in FIG. 3. Cutting apparatus 48 comprises a 10 inch table saw manufactured by Rockwell International Corporation of Pittsburgh, Penna. The saw rotates a 32 tooth cross-cut, carbide tipped cutting blade at 4,200 rpm. The blade was set for a cutting depth of ¼ of an inch. A Uniroyal, steel-belted "Tigerpaw" radial tire, size P205/75R14, (TPC Spec. SPC. 1025 MS) was placed on the table saw and cut randomly on the tread and sidewall stock. Sufficient pressure was applied to the tire to initiate and maintain tire cutting without excessive smoke being produced. The cut particles were retrieved from a manufacturer installed U-shaped deflector plate mounted to the table saw forward of the saw blade and below the table support member.

The cut particles formed fluffy masses of various sizes from approximately 0.2 millimeters to one centimeter. When viewed under a microscope, a majority of the particles were attached to adjacent particles to define a large number of interstitial spaces. Outer surfaces of the particles appeared "glassy" which indicated melting or softening of the rubber. When placed on a water surface, the particle masses remained afloat.

EXAMPLE 2

Using the equipment in Example 1, a lubricant comprising by volume approximately 50% water and 50% 30 weight non-detergent oil was sprayed on the saw blade during cutting as illustrated generally in FIG. 4. The lubricant allowed random cuts in the tread and side wall stock of the tire of Example 1 at an increased rate with minimal cutting smoke. The cut particles formed masses which exhibited the physical characteristics described above in Example 1.

EXAMPLE 3

Figure 7:
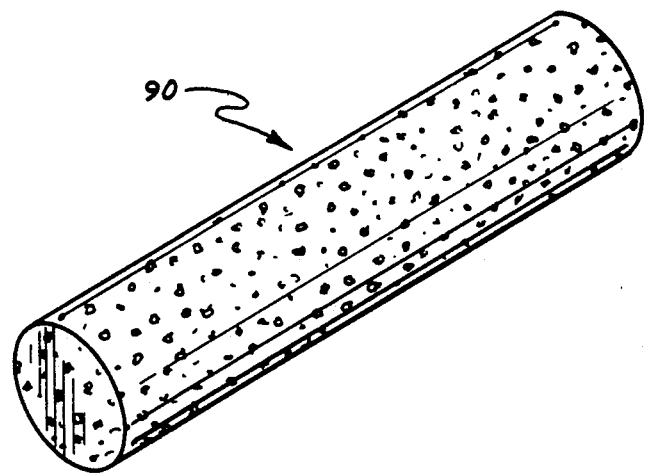
FIG. 7 is a perspective view of the second embodiment of the oleophylic article of the present invention.

An oleophylic article shown in FIG. 7 was made generally as illustrated in FIG. 5. Pressing apparatus 70 comprised a brass block having a two inch diameter cylindrical opening. Four V-channeled grooves, approximately 1/16 of an inch on edge, were cut into an end of the block. A brass plate was secured to the same end of the block to form four V-channeled orifices.

Precut, unadhered used rubber tire particles (size 10 mesh and smaller) from Trash Depo Inc. of Moorhead, Minn., were placed within the block opening. A 2 inch aluminum piston was placed on top of the particles and in the opening. The brass block was heated approximately to 600° F. The heated block and piston were placed under a hydraulic press. A pressure of 200 psi was applied to the piston to force the compressed particles through the orifices. The particles expanded after exiting the orifices as a mass to a cylindrical shape having a diameter of ¼ of an inch. Interstitial spaces were located within the article while outer surfaces of the particles appeared glassy which indicated de-vulcanization or cross-linking elimination at the outer surfaces of the particles. When placed on a water surface, the article remained afloat.

EXAMPLE 4

The precut unadhered rubber particles described in Example 3 were placed within the block opening of the pressing apparatus of Example 3. The block was heated to approximately 400° F. A pressure of 200 psi was applied with the hydraulic press and piston to force compressed particles through the orifices. The particles expanded after exiting the orifice. However, outer surfaces of the particles did not appear glassy to indicate any de-vulcanization. The particles were loosely attached and sank when deposited on a water surface.

EXAMPLE 5

The precut unadhered rubber particles described in Example 3 were placed within the block opening of the pressing apparatus of Example 3. The block was heated to approximately 800° F. A pressure of 200 psi was applied with the hydraulic press and piston to force compressed particles through the orifices. Outer surfaces of the resultant particle mass did appear glassy to indicate de-vulcanization, however, the mass was hard with little resiliency. Interstitial spaces were not observed within the article.

EXAMPLE 6

The precut unadhered rubber particles described in Example 3 were placed within the block opening of the pressing apparatus of Example 3. The block was heated to approximately 600° F. A pressure of 200 psi was applied with the hydraulic press and piston however, the compressed particles were not allowed to exit the orifices. Pressure was maintained until the block temperature had cooled. The resultant article was removed from the opening. Outer surfaces of the particles appeared glassy to indicate de-vulcanization. Interstitial spaces were not observed within the article. When placed on a water surface, the article sank.

EXAMPLE 7

An oleophylic article mass in accordance with the present invention was made generally as illustrated in FIG. 10. Cutting apparatus 119 comprised a grinding drum 8 inches in length and 8 inches in diameter that was rotated at 3600 rpm from a 25 HP electric motor. The grinding surface on the grinding drum comprised 1/16 inch through ¼ inch carbide chips randomly distributed throughout the grinding surface and bonded to the drum with a stainless steel matrix. Tire stock from the used rubber tire of Example 1 was placed in a feed plunger 8 inches in length and 4 inches wide. The feed plunger was connected to an air compressor and directed the tire stock against the rotating drum at a rate of approximately 1.3 feet per minute. A cooling spray comprising a fine mist of water was sprayed on the rotating drum during the grinding at a rate of 1/20 of a gallon per minute.

The tire stock was applied to the rotating grinding drum with an estimated contact pressure of 20 psi. The contact pressure is an estimate due to compression of the tire stock in the feed plunger and the general inability to directly measure contact pressure. Approximately 60% of the ground tire stock formed fluffy masses of various sizes having interstitial spaces. The remainder appeared to be hard, solid particles. When placed on a water surface, the hard solid particles sank while the fluffy masses remained afloat.

EXAMPLE 8

Using the cutting apparatus and tire stock described in Example 7, the tire stock was applied to the rotating grinding drum with an estimated contact pressure of between 5 and 15 psi. Approximately 80% to 90% of the ground tire stock formed fluffy masses having interstitial spaces while the remainder formed hard solid particles.

EXAMPLE 9

The oil adsorption capabilities of the adhered particle mass prepared in Example 1 were approximated with the following test method. Two 400 milliliter beakers were partially filled with tap water. Measured amounts of a medium weight crude oil were added to each beaker and allowed to separate as an oil surface body. Measured amount of the particle mass of Example 1 were then added to each beaker. The particle masses were stirred with medium weight crude oil and allowed to stand. By weight, each beaker comprised:

TABLE 1

|  | BEAKER 1 | BEAKER 2 |
| --- | --- | --- |
| A) Water | 187.41 g | 190.87 g |
| B) Crude Oil | 13.09 g | 14.57 g |
| C) Particle Mass | 3.27 g | 4.86 g |
| Ratio of B/C | 4:1 | 3:1 |

The following results were obtained. In beaker 1, the particle mass immediately adsorbed the medium weight crude oil except for a very thin film which remained on the water surface. This oil film was present in beaker 1 after 15 minutes. In beaker 2, the particle mass also immediately adsorbed the oil except for a thin layer that remained on the water surface after stirring. However, unlike the thin oil film present in beaker 1, the thin oil film present in beaker 2 disappeared within 5 minutes after stirring. The particle mass and oil mixture formed a large conglomerate in both beakers. The conglomerate remained afloat during and after oil adsorption.

From the foregoing example, the particle mass exhibits by weight adsorption capabilities of a medium weight crude oil approximately 3:1.

EXAMPLE 10

The oil sorption capabilities of the particle mass prepared in Example 1 were approximated with the following test method. Two 600 milliliter beakers were partially filled with tap water. Measured amounts of a medium weight crude oil were added to each beaker and allowed to separate as an oil surface body. Measured amounts of the adhered particle mass of Example 1 were then added to each beaker. By weight each beaker comprised:

TABLE 2

|  | BEAKER 1 | BEAKER 2 |
| --- | --- | --- |
| A) Water | 387.15 g | 403.46 g |
| B) Crude Oil | 14.83 g | 21.31 g |
| C) Particle Mass | 6.65 g | 2.65 g |
| Ratio of B/C: | 2.23:1 | 8.04:1 |

The following results were obtained. After gently stirring three times during a 20 hour test period, the particle mass of beaker 1 formed a conglomerate that remained afloat and which sorbed all the oil except for a small amount that remained attached to the side of the beaker. The mixture of beaker 2 was gently stirred 10 times during the same 20 hour test period. After 20 hours, all the oil had been sorbed by the particle mass and formed a conglomerate that remained afloat. With slight agitation, a thin oil film reappeared on the water surface of beaker 2.

From this example, it is shown that the particle mass exhibits a sorption ratio by weight of about 8:1 with medium weight crude oil when exposed for sufficiently long times so that the oil penetrates into the rubber substrate in distinction to shorter exposure times (e.g. Example 9) where sorption is primarily in the interstitial spaces.

EXAMPLE 11

The sorption capabilities of the adhered particle mass prepared in Example 1 for a low temperature and deposited on an aqueous solution including sodium chloride were studied with the following method. A 600 milliliter beaker was partially filled with water comprising 3.5% sodium chloride. The temperature of the solution was lowered to 0° C. and a measured amount of medium weight crude oil of the same temperature was added and allowed to separate as an oil surface body. At 0° C. it was observed that some ice chunks did exist within the solution. A measured amount of particle mass of Example 1 was then added to the beaker and stirred gently and allowed to stand. By weight, the beaker comprised:

TABLE 3

| A) Water | 347.24 g - 3.5% NaCl at 0° C. |
| --- | --- |
| B) Crude Oil | 15.44 g at 0° C. |
| C) Particle Mass | 5.10 g |
| Ratio of B/C | 3:1 |

The sodium chloride aqueous solution, the lower temperature of that solution and the presence of ice in the beaker did not appear to inhibit either sorption of the medium weight crude oil by the particle mass or flotation of the mass after oil sorption. Although the viscosity of the crude oil had increased due to the lower temperature of the crude oil as compared to the previous examples, rate of sorption of crude oil was similar to the rate observed in beaker 2 of Example 10.

EXAMPLE 12

The oil sorption capabilities of the adhered particle mass prepared in Example 3 were approximated with the following test method. One 400 milliliter beaker was partially filled with 186.9 grams of tap water. 18.2 grams of a medium weight crude oil was then added to the beaker and allowed to separate as an oil surface body. 3.26 grams of the particle mass of Example 3 was added and stirred gently with the medium weight crude oil and allowed to stand.

After the particle mass had been exposed to the crude oil for 3 minutes, the mixture was drained on a wire screen of 10 mesh for 3 minutes. The resultant particle mass weighed 14.07 grams corresponding to oil sorption of 10.76 grams. By weight, the sorption ratio of the particle mass of Example 3 relative to oil was approximated at 3.3 to 1.

EXAMPLE 13

The oil sorption capabilities of the adhered particle mass prepared in Example 7 were approximated with the following test method. One 400 milliliter beaker was partially filled with 182.53 grams of tap water. 20.1 grams of a medium weight crude oil was then added to the beaker and allowed to separate as an oil surface body. 4.35 grams of the fluffy particle mass of Example 8 was added and stirred gently with the medium weight crude oil and allowed to stand.

After the particle mass had been exposed to the crude oil for three minutes, the mixture was drained on a wire screen of 10 mesh for three minutes. The resultant particle mass weighed 19.57 grams corresponding to oil sorption of 15.22 grams. By weight, the sorption ratio of the particle mass of Example 8 relative to oil was approximated at 3.5 to 1.

EXAMPLE 14

The barrier capabilities of the present invention in a non-aqueous medium are shown in the present example. A perforated plate, two inches wide and 11 inches in length having ¼ inch holes on one inch centers, was supported one inch above the bottom of an 18 inch clear, rectangular, acrylic container having inside base dimensions equal to that of the perforated plate. Above the perforated plate, the container comprised the following layers: a bottom layer of silica sand (30 mesh) six inches in height; a one inch layer of adhered particle mass prepared as disclosed in Example 1; and a top layer of silica sand (30 mesh) six inches in height.

A two inch layer of medium crude oil was poured on top of the top layer of sand and allowed to percolate through the top layer. The medium crude oil reached the adhered particle mass layer after 2-½ minutes. Although the container was allowed to stand for two days, the crude oil did not percolate through the particle mass layer to the underlying bottom layer of sand.

EXAMPLE 15

The rectangular container was refilled as described in Example 14 with a bottom layer of silica sand, an interposed layer of adhered particles prepared as disclosed in Example 1 and a top layer of sand. A five inch layer of medium weight crude oil was poured on the top layer of sand and allowed to percolate therethrough. The crude oil again reached the particle mass layer in 2-½ minutes. The container was allowed to stand for two days, however, the crude oil did not percolate through the particle mass layer.

In summary, the present invention provides an oil sorption article that can be used both on land or water. The article is effective for spilled oil around above ground tanks and pipes or, as shown in the previous example, as a safeguard to prevent spilled oil from penetrating into the ground around under ground storage tanks, pipes or landfills. When used on an aqueous medium such as spilled oil from an ocean tanker, the article will sorb many times its weight, yet still remain afloat as a manageable conglomerate.

Although the present invention has been described with reference to preferred embodiments, workers skilled in the art will recognize that changes may be made in form and detail without departing from the spirit and scope of the invention.

What is claimed is:

1. A method for forming an article for sorbing oil, the method comprising:
   eliminating a portion of cross-linking of substantially cross-linked polymer particles to form adhesive areas from the particles on at least a portion of outer surfaces of a majority of the particles; and
   attaching the particles to each other using the adhesive areas to define interstitial spaces between the attached particles.

2. The method of claim 1 wherein the step of eliminating comprises heating the portion of the outer surfaces to a sufficient temperature to eliminate cross-linking at the portion.

3. The method of claim 2 wherein the step of eliminating includes abrading the particles to generate heat.

4. The method of claim 3 wherein the step of eliminating includes forming the particles from a substantially cross-linked polymer block.

5. The method of claim 4 wherein the step of eliminating comprises cutting the polymer block with a suitable cutting apparatus.

6. The method of claim 5 wherein the step of eliminating includes generating frictional heat from cutting the polymer block.

7. The method of claim 6 wherein the step of eliminating comprises generating heat sufficient to eliminate cross-linking at the portion substantially only from cutting the polymer block.

8. The method of claim 6 wherein the step of attaching comprises displacing cut particles from a cutting element of the cutting apparatus such that the particles contact and attach to each other.

9. The method of claim 8 wherein the cutting apparatus is a rotating blade and the step of attaching comprises displacing the cut particles from the rotating blade as the blade rotates.

10. The method of claim 2 wherein the step of attaching comprises the steps of compressing the particles together and then allowing the particles to expand.

11. The method of claim 2 wherein the step of eliminating includes heat generated from compression.

12. An article for sorbing oil, the article comprising:
    a plurality of polymeric particles cross-linked substantially throughout each particle and having adhesive area formed by eliminating a portion of the cross-linking on a portion of outer surfaces of a majority of the particles, the particles being adhered together with the adhesive areas to define a plurality of interstitial spaces.

13. The article of claim 12 wherein the cross-linking has been eliminated through heating.

14. The article of claim 12 and oil consuming microorganisms on portions of the outer surfaces of the majority of particles.

15. The article of claim 12 wherein the article floats on an aqueous medium.

16. The article of claim 12 wherein the particles comprise rubber.

17. The article of claim 16 wherein the particles are formed from rubber tires.

18. The article of claim 16 wherein the article is a fluffy mass approximately 0.2 millimeter to 1 centimeter in length.

19. The article of claim 16 wherein the rubber particles are approximately of size 10 mesh and smaller.

20. The article of claim 16 wherein the article is cylindrical in shape.

21. A floatable article for sorbing oil from the surface of an aqueous medium, the article comprising:
    a plurality of cross-linked rubber particles having adhesive areas formed by eliminating a portion of the cross-linking on a portion of outer surfaces of a majority of the particles, the particles attached together with the adhesive areas to define a plurality of interstitial spaces.

22. The article of claim 21 wherein the particles are formed from rubber tires.

23. The article of claim 22 wherein the article adsorbs the oil into a portion of the interstitial spaces wherein the oil is received and retained on the outer surfaces of the particles forming the portion of the interstitial spaces.

24. The article of claim 23 wherein the oil is a medium weight crude oil and the article exhibits by weight adsorption capabilities of the oil approximately 3:1.

25. The article of claim 22 wherein the oil is a medium weight crude oil and the article exhibits by weight sorption capabilities of the oil approximately 8:1 when the article is exposed to the oil for a sufficient length of time such that the oil penetrates into the rubber particles.

* * * * *

UNITED STATES PATENT AND TRADEMARK OFFICE
CERTIFICATE OF CORRECTION

PATENT NO. : 5,180,704

DATED : January 19, 1993

INVENTOR(S) : WILHELM REINDLE, DOIL WILLIAMS

It is certified that error appears in the above-identified patent and that said Letters Patent is hereby corrected as shown below:

Col. 14, line 24, delete "claim 2", insert "claim 1"

Signed and Sealed this

Twenty-eighth Day of December, 1993

Attest:

BRUCE LEHMAN

Attesting Officer

Commissioner of Patents and Trademarks